Oct. 25, 1966 F. C. RICHES 3,281,791

ELECTRONIC REMOTE INDICATING AND/OR CONTROLLING APPARATUS

Filed March 7, 1960 2 Sheets-Sheet 1

Oct. 25, 1966 F. C. RICHES 3,281,791

ELECTRONIC REMOTE INDICATING AND/OR CONTROLLING APPARATUS

Filed March 7, 1960 2 Sheets-Sheet 2

United States Patent Office 3,281,791
Patented Oct. 25, 1966

3,281,791
ELECTRONIC REMOTE INDICATING AND/OR CONTROLLING APPARATUS

Frederick Charles Riches, London, England, assignor to Sargrove Electronics Limited, Hounslow, Middlesex, England, a British company Filed Mar. 7, 1960, Ser. No. 13,373
5 Claims. (Cl. 340—172)

This invention relates to the provision of an electronic system for indicating and/or controlling conditions at a remote station or stations.

It often happens that a controller in an operations room requires to know the conditions at a number of remote stations. Indicating systems of this general kind may be required in coal mines, in ships, in large industrial installations such as petrol cracking plants and so on.

One object of the present invention is to provide a three state system in which an indication is given not only of "all correct" and of "failure" but also of any other required condition. As an example, the third indication in a coal mine may be preset to give warning if a concentration of gas builds up at a remote station and becomes greater than a predetermined maximum safe amount.

The system may be so arranged that the three states are indicated by the presence and condition of oscillations produced at the remote stations, such that:

At the first state the oscillator is transmitting at full amplitude.

At the second state the oscillator is transmitting at about 50% amplitude.

At the third state the oscillator is shut down, i.e., in a non-oscillatory condition.

Therefore, in a system according to the present invention there is a second state in which the oscillator is producing oscillations at approximately 50% amplitude.

In order that the invention may be clearly understood and readily carried into effect, reference is now directed to the accompanying drawings, in which.

Figure 1:
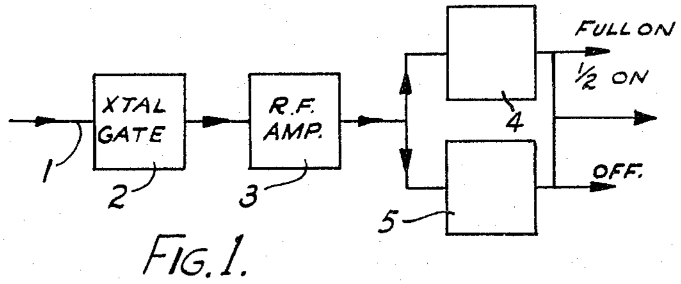
FIGURE 1 is a block diagram of the circuitry at the operations room.

In FIGURE 1 the input from a common cable 1 to which all the remote stations are connected leads to a crystal gate 2 and then to an R.F. amplifier 3. The amplifier 3 is connected to a pair of networks 4 and 5 having intercoupled outputs to provide "full on," "half on," and "off" or "failure" indication signals.

Figure 2:
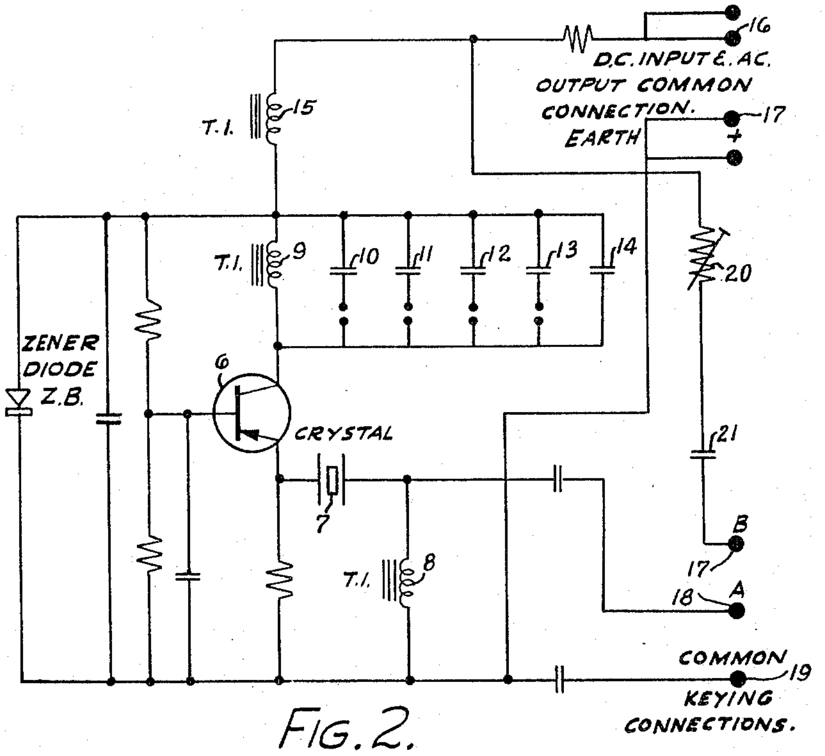
FIGURE 2 is a circuit of a transistor crystal controlled oscillator for use at a remote station.

FIGURE 2 illustrates a transistor oscillator unit for use at a remote station. It is believed that the circuit arrangement will be apparent from the drawing from which it will also be noted that the keying connections are brought out in a correct manner, thus:

In the first state the oscillator is oscillating at full amplitude and transmitting in the co-axial cable which connects the remote stations to the near station.

In the second state the connections are to Common and B to give half amplitude output condition by simply de-coupling the signal through a 2.5K ohm potentiometer 20 and a 1 mfd. capacitor 21. In the third state, keying leads connected to "A," the oscillator is shut down to a non-oscillatory condition.

The circuit of FIGURE 2 comprises an oscillator provided with transistor 6 for oscillation at a frequency under control of crystal 7 regeneratively excited from winding 8 of transformer T1. Winding 9 of transformer T1. is resonated at substantially the crystal frequency by parallel condenser 14 and such condensers 10–13 as may be necessary at the desired crystal frequency. The zener diode shown in the circuit protects transistor 6 from over-voltage in its energization circuit. Winding 15 of transformer T1. provides the output signal at terminal 16. Terminal 17 is grounded. When terminals 18 and 19 are connected together at the remote station, the oscillator is inoperative in its third state, since the regenerative winding 8 of transformer T1. is effectively shunted. When terminals 17 and 19 are connected together at the remote station, the oscillator circuit operates at substantially half amplitude, since output winding 15 of transformer T1. is shunted by resistor 20 and condenser 21.

Figure 3:
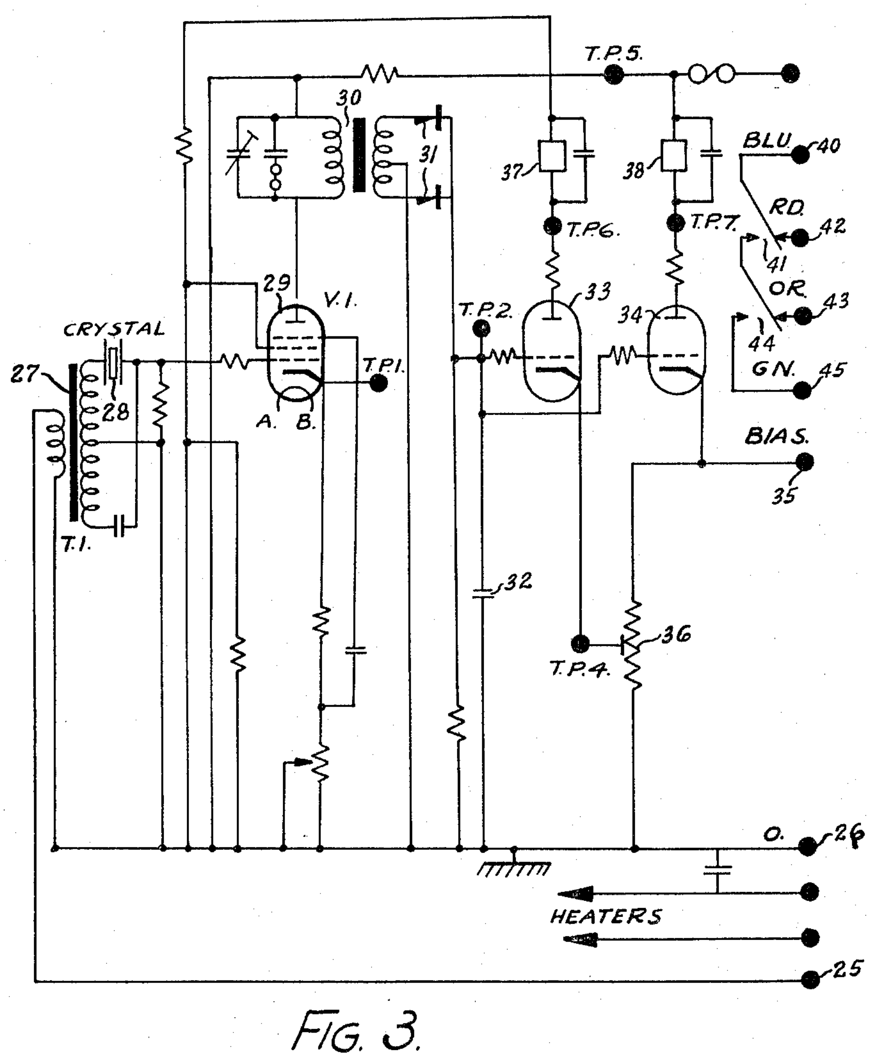
FIGURE 3 is a circuitry unit for use at an operations room.

To accommodate the third state in the crystal gate, the circuit of FIGURE 3 incorporates an additional relay. The tubes controlling the relay operations are biased at different levels to receive the "No" signal condition and the half amplitude carrier of the transmitter unit.

In more detailed reference to FIGURE 3, the signal from terminals 16 and 17 of FIGURE 2 will be received respectively at terminals 25 and 26. The incoming signal therefore excites the transformer 27 whose secondary is provided with crystal 28 responsive at the same frequency as crystal 7 of FIGURE 2. The transformer with the crystal provides an input network which discriminates in favor of the signal from the appropriate oscillator at the remote station, and rejects other signals. The signal is amplified in pentode 29 and fed to tuned output transformer 30. The output signal is rectified by diodes 31 and the rectified output voltage is smoothed by condenser 32. In the diode polarity shown, the control signal developed on condenser 32 is positive in polarity, and of an amplitude representative of the first, second, and third states of the remote oscillator. The control voltage is applied to the grids of triodes 33 and 34, whose cathodes are biased by voltage supplied at terminal 35. The cathode of tube 34 receives full bias, while the cathode of triode 33 receives a selected and smaller bias voltage from voltage divider 36.

Triodes 33 and 34 are respectively connected at their anode circuits to relays 37 and 38. In the third state of the remote oscillator, no input voltage is applied at terminal 25 and both relays are open. In the second state of the remote oscillator, substantially half the full amplitude signal is received at terminal 25, and triode 33 is put into conduction to activate relay 37. In the first state of the remote oscillator to which crystal 28 is tuned, both triodes 33 and 34 are conductive and both relays 37 and 38 are energized.

In the situation shown in FIGURE 3, voltage from terminal 40 is applied to contacts 41 of relay 37 to terminal 42, to which may be connected a red indicating lamp. This is indicative of the third state of the remote oscillator. In the second state of the remote oscillator, relay 37 is energized and terminal 43 receives the activating voltage for an orange indicator light through contacts 41. In the first state of the remote oscillator, both relays 37 and 38 are energized, and the latter through its contacts 44 energizes terminal 45 for the illumination of a green indicator lamp at the near station.

If it is desired that the third state of the system shall operate to control a function as well as or instead of indicating a condition the system may be reversed so that instead of signalling a condition remotely it is possible to command or actuate controls by complete reversal of the system. In the case of a mines signalling and control system where intrinsic safety certificates are required, this necessitates the transistorization of the crystal gate so that the necessary certificate indicating compliance with safety requirements can be obtained and naturally, it is quite practical to employ transistor techniques in the crystal gate circuit.

It will be noted that the overall system of transmission comprises:

(1) A remote transmission unit.

(2) A co-axial line coupling the remote unit to the near station.

(3) A gating unit at the near station receiving the signals from the remote station via the line.

The above described system is adapted to indicate at a near station such as an operations room, "full on," "half on," or "failure" conditions at a remote station. It comprises a frequency source such as an oscillator unit or other appropriate means for generating a signal frequency associated with electrical control means or other apparatus to be monitored at a remote station. Indicator means at the near station is connected by a cable with the installation at the remote station to indicate conditions prevailing at the latter. If desired, a plurality of remote stations comprising frequency sources generating different frequencies may be coupled to a common cable leading to the near station where common amplifying means are provided feeding a plurality of indicator networks having filter circuits corresponding in number and frequency to those of the remote units.

What I claim is:

1. An electronic indicator system for indicating at a near station conditions at a remote station comprising a remote crystal controlled oscillator unit operative to produce an oscillatory current of a predetermined fixed amplitude and frequency, responsive to control means operating in dependency on apparatus to be monitored to switch the oscillator between the operative predetermined amplitude condition and an inoperative condition, cable means for conducting the oscillatory currents to the near station, a crystal filter circuit at the near station corresponding in frequency to that of the remote unit coupled to the cable means, indicating means at the near station connected to the output of the filter operative responsively to the signal received from the oscillator unit to indicate "full on" or "failure" conditions at the remote station in response to operation of the oscillator unit at predetermined amplitude or zero amplitude respectively, and signal control means for the remote station operative responsively to local control means to effect delivery to the cable of an oscillator signal having an amplitude substantially half the predetermined full oscillator amplitude.

2. An electronic indicator according to claim 1 further comprising means at the near station selectively responsive to half the full oscillator signal amplitude.

3. An electronic indicator according to claim 1 further comprising indicating means at the near staton selectively responsive to half the full oscillator signal amplitude.

4. An electronic indicator according to claim 1 further comprising control means at the near station selectively responsive to half the full oscillator signal amplitude.

5. An electronic indicator according to claim 1 further comprising control means for the indicating means responsive to the filter circuit comprising oscillatory current rectifier means feeding a pair of differentially biased current control devices.

References Cited by the Examiner

UNITED STATES PATENTS

| | | | |
|---|---|---|---|
| 1,365,329 | 1/1921 | Lewis. | |
| 2,515,254 | 7/1950 | Nosker | 340—172 |
| 2,585,545 | 2/1952 | Gannett | 340—147 |
| 2,640,973 | 6/1953 | Cleaver | 340—182 |
| 2,677,122 | 4/1954 | Gardner | 340—171 |
| 2,700,696 | 1/1955 | Barker | 340—347 |
| 2,724,745 | 11/1955 | Brewer | 340—172 |
| 2,831,178 | 4/1958 | Ensink et al. | 340—172 |
| 2,912,684 | 11/1959 | Steele | 340—324 |
| 2,946,991 | 7/1960 | Lindenberg | 340—244 |

NEIL C. READ, *Primary Examiner.*

BLYTHE B. MILLER, STEPHEN W. CAPELLI, *Examiners.*

W. K. TAYLOR, K. E. JACOBS, P. EIARHOS, *Assistant Examiners.*